(12) United States Patent  (10) Patent No.: US 7,873,056 B2
Higuchi et al.  (45) Date of Patent: Jan. 18, 2011

(54) SWITCH DEVICE, SWITCHING METHOD AND SWITCH CONTROL PROGRAM

(75) Inventors: Junichi Higuchi, Tokyo (JP); Takashi Yoshikawa, Tokyo (JP); Shigeyuki Yanagimachi, Tokyo (JP); Youichi Hidaka, Tokyo (JP)

(73) Assignee: NEC Corporation, Tokyo (JP)

( * ) Notice: Subject to any disclaimer, the term of this patent is extended or adjusted under 35 U.S.C. 154(b) by 761 days.

(21) Appl. No.: 11/719,686

(22) PCT Filed: Nov. 18, 2005

(86) PCT No.: PCT/JP2005/021264

§ 371 (c)(1), (2), (4) Date: May 18, 2007

(87) PCT Pub. No.: WO2006/054704

PCT Pub. Date: May 26, 2006

(65) Prior Publication Data

US 2009/0175281 A1  Jul. 9, 2009

(30) Foreign Application Priority Data

Nov. 18, 2004  (JP) .............................. 2004-334866

(51) Int. Cl.
*H04L 12/56* (2006.01)

(52) U.S. Cl. ...................... 370/400; 370/390; 370/401
(58) Field of Classification Search ....................... None
See application file for complete search history.

(56) References Cited

U.S. PATENT DOCUMENTS 4,417,245 A * 11/1983 Melas et al. ............... 340/2.22

(Continued)

FOREIGN PATENT DOCUMENTS

JP  3-49445 A  3/1991

(Continued)

OTHER PUBLICATIONS

Lee et al.; "A New Decomposition Algorithm for Rearrangeable Clos Interconnection Networks"; IEEE Transactions on Communications, vol. 44, No. 11, Nov. 1996, pp. 1572-1578.

*Primary Examiner*—Jayanti K Patel
*Assistant Examiner*—Anthony Sol
(74) *Attorney, Agent, or Firm*—Dickstein Shapiro LLP

(57) ABSTRACT

A switch device is composed of a switch portion 1-1, input side port mapping blocks 1-4-1 to 1-4-P, output side port mapping blocks 1-5-1 to 1-5-P, and a virtualization controller (central controller) 1-0 so that the switch device can be logically divided into a plurality of switches each having a capacity smaller than a physical switch capacity or the divided switches can be logically integrated. The switch portion has a plurality of first input ports and a plurality of first output ports. Each of the input side port mapping blocks has a plurality of second input ports and inputs the signals input to the plurality of second input ports to the first input ports of the switch portion. Each of the output side port mapping blocks has a plurality of second output ports and outputs the signals output to the first output ports of the switch portion from the plurality of second output ports.

24 Claims, 11 Drawing Sheets

U.S. PATENT DOCUMENTS

| | | | |
|---|---|---|---|
| 5,724,352 A * | 3/1998 | Cloonan et al. | 370/388 |
| 6,128,292 A * | 10/2000 | Kim et al. | 370/356 |
| 7,596,135 B1 * | 9/2009 | Iovine et al. | 370/388 |
| 2008/0267182 A1 * | 10/2008 | Smiljanic | 370/390 |

FOREIGN PATENT DOCUMENTS

| | | |
|---|---|---|
| JP | 6-70385 A | 3/1994 |
| JP | 07-101876 B2 | 11/1995 |
| JP | 10-511820 A | 11/1998 |
| JP | 11-232237 A | 8/1999 |
| JP | 2002-325087 A | 11/2002 |
| WO | WO-96/18278 A1 | 6/1996 |

* cited by examiner

SELECTOR

TIME DIVISION MULTIPLEX

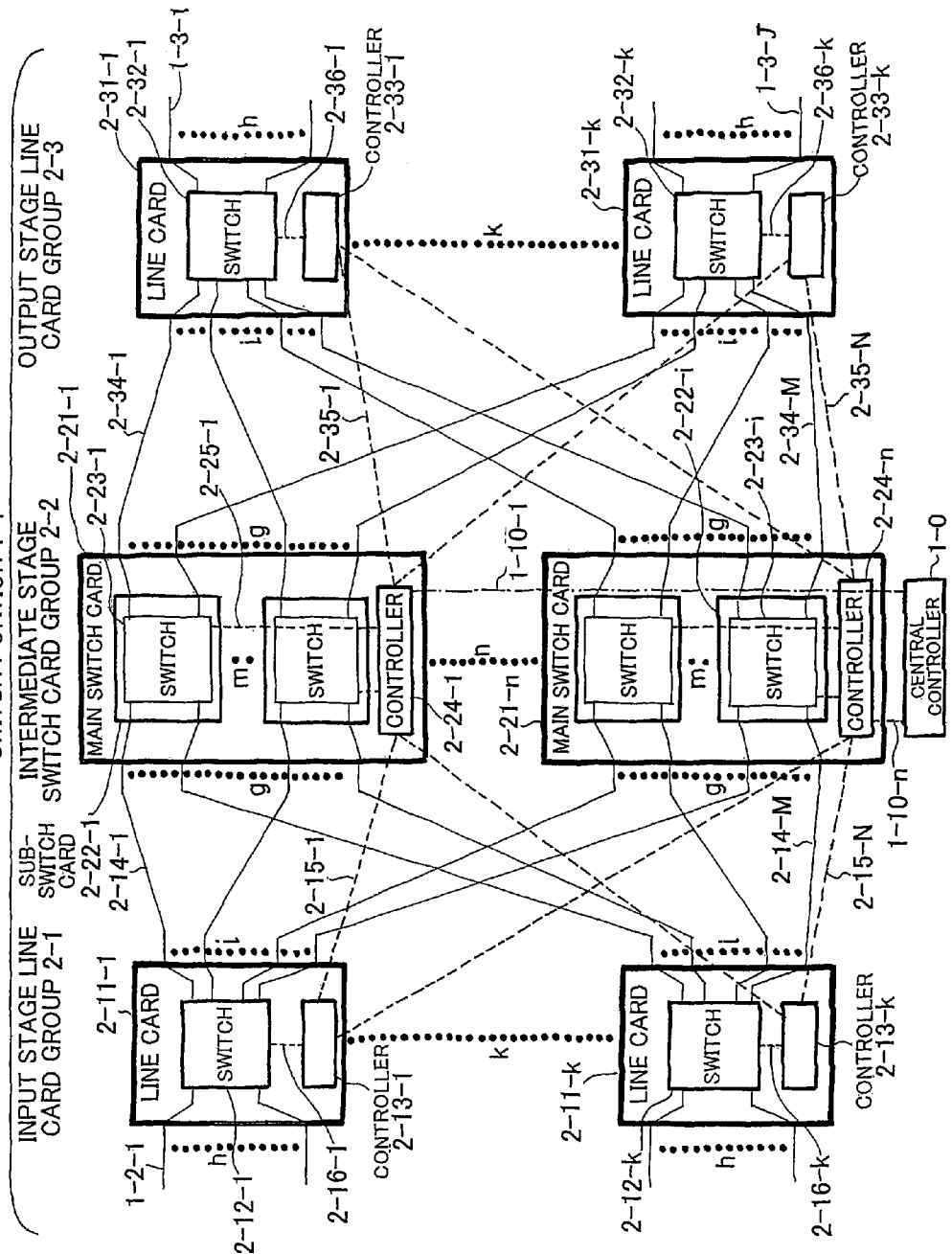

STACK TYPE CHASSIS 7

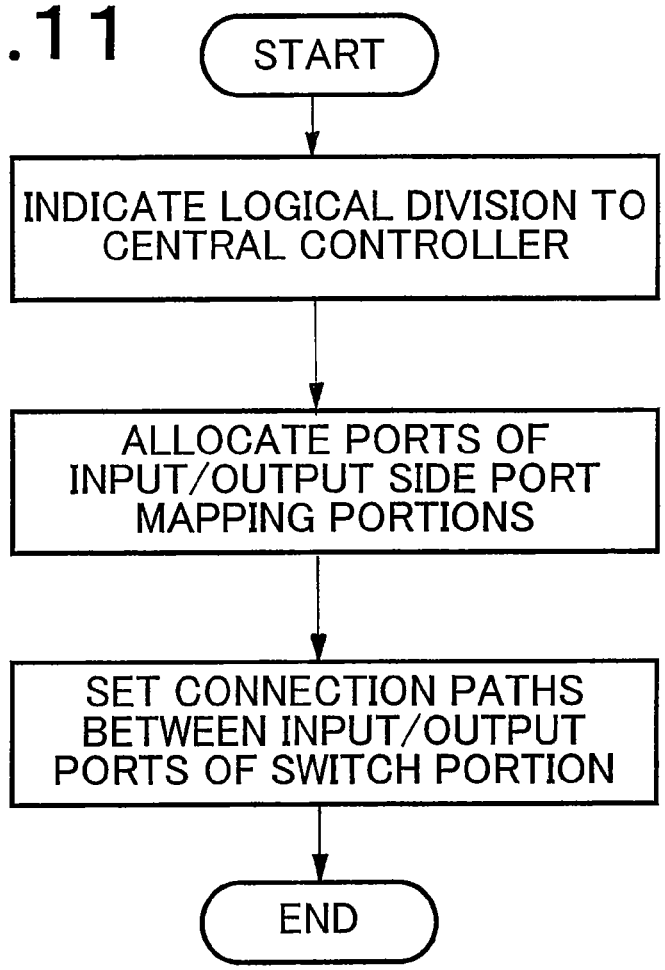
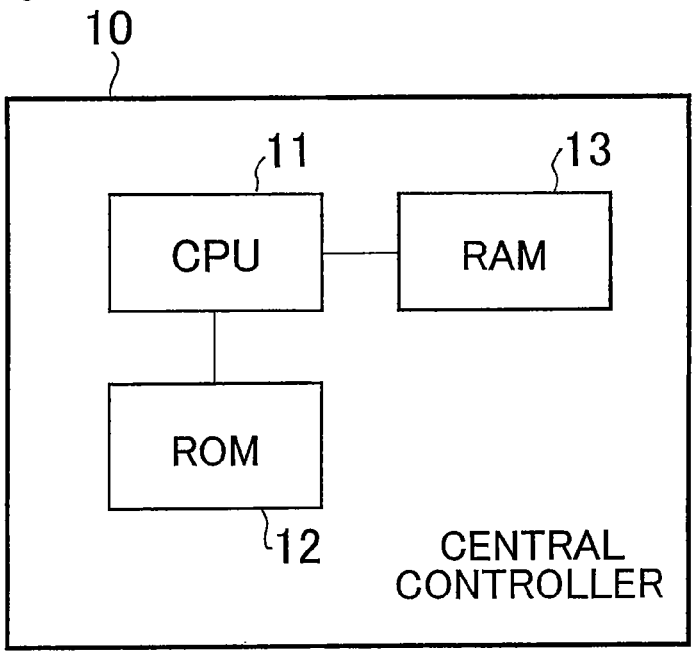

SWITCH DEVICE, SWITCHING METHOD AND SWITCH CONTROL PROGRAM

TECHNICAL FIELD

The present invention relates to a switch device, a switching method, and a switch control program, and particularly, to a large capacity switch device having optional expandability realized by virtualization, a switching method, and a switch control program.

BACKGROUND ART

Recently, traffic amount on a network is becoming increasingly larger. Since a bottleneck on the network shifts from a transmission path to a switch device and a router device due to the progress of optical transmission technology, a large capacity switch is required. However, it is a wasteful investment from the economical point of view to introduce a large capacity switch from a stage of small traffic mount.

That is, it is sufficient for a switch to have a small capacity at the initial stage of business. Accordingly, a switch device is required to optionally expand its capacity so that it has a small capacity at first, increases the capacity as the number of users increases, and is finally constructed as a large capacity switch.

There is a multi-stage switch arrangement as one of methods of expanding the switch capacity. The multi-stage switch is disclosed in Patent Document 1.

As shown in FIG. 10, the multi-stage switch disclosed in Patent Document 1 is composed of a plurality of unit switches. For example, a three-stage CLOS switch (CLOS is the name of an inventor) is composed of a three-stage unit switch group including an input stage 8-1, an intermediate stage 8-2, and an output stage 8-3. In the input stage, unit switches 8-11-1 to 8-11-$k$ are arranged by disposing k pieces of m×n unit switches each having m pieces of input lines (FIG. 10 shows only an input line 8-12-1 in input lines 8-12-1 to 8-12-$m$ of a unit switch 8-11-1) and n pieces of output lines (FIG. 10 shows only an output line 8-13-1 in output lines 8-13-1 to 8-12-$n$ of a unit switch 8-11-1) in parallel. In the intermediate stage, unit switches 8-21-1 to 8-21-$n$ are arranged by disposing n pieces of k×h unit switches in parallel. In the output stage, unit switches 8-31-1 to 8-31-$h$ are arranged by disposing h pieces of n×j unit switches in parallel. Note that FIG. 10 shows only an input line 8-32-1 in input lines 8-32-1 to 8-12-$n$ of the unit switch 8-31-1. Further, FIG. 10 shows only an output line 8-33-1 in output lines 8-33-1 to 8-33-$j$ of the unit switch 8-31-1. The unit switch group of the input stage is connected to the unit switch group of the intermediate stage through lines 8-13-1 to 8-13-$(n \times k)$, and the unit switch group of the intermediate stage is connected to the unit switch group of the output stage through lines 8-32-1 to 8-32-$(n \times h)$, thereby an mk×jh large capacity switch device is arranged.

As described above, in the multi-stage switch arrangement, a switch having a capacity according to the number of unit switches of the respective stages and the number of links corresponding to the number of the unit switches can be arranged by using small capacity unit switches.

Further, there is a stack arrangement as a method of expanding the switch capacity. In the stack arrangement, a plurality of units of the same switch devices are connected and connected to each other so that the switch devices are operated as a large capacity device having ports corresponding to the number of stacks. With this arrangement, the capacity of the device can be expanded to integer times of a unit device.

In contrast, there is a VLAN (Virtual Local Area Network) as a method of using a switch by dividing its capacity. In a port VLAN, a VLAN-ID (Identification) is allocated to each port of a switch so that a VLAN to which a packet to be accepted belongs can be set to the respective ports of the switch. That is, when each VLAN is observed, it seems as if only a part of the switch was divided and used.

Note that Patent Document 2 discloses to subject a switch to logical division as a technology relating to the present invention.

Patent Document 1: Japanese Patent Application Laid-open (JP-A) No. 2002-325087 (FIG. 11 of the Patent Document 1)

Patent Document 2: Japanese Patent Application Laid-open (JP-A) No. 11-232237 (FIG. 14 and paragraph No. (0011) of DESCRIPTION the Patent Document 2).

DISCLOSURE OF THE INVENTION

However, even if a switch having expandability is arranged by using the multi-stage switch arrangement or the stack arrangement as described above, the thus arranged switch has the following problems.

A first problem resides in that the capacity of a switch device can be expanded at only integer times of the capacity of a unit switch. This is because the unit switch cannot be easily divided into switches having a smaller capacity. Further, when a switch is divided using the port VLAN, a LAN side (packet side) is divided and the switch itself is not divided.

A second problem resides in that when a large capacity switch is provided by the stack arrangement, a sufficient performance cannot be realized when a plurality of switch devices are coupled with each other and handled as a single large capacity switch. This is because that a connecting distance is made longer in inter-device connection than in internal connection of the device and thus a band is reduced, from which internal blocking occurs in the coupled switch devices.

A third problem resides in that when a large capacity switch is provided by a multi-stage switch, a sufficient performance cannot be realized because a mounting size is increased. This is because as a switch capacity is increased, it is required to mount switch chips after they are divided into a plurality of cards because the size and the number of connections of the switch chip increase and mounting area of the switch chips increases. In this case, since inter-switch connection is made long due to inter-card connection having a long connecting distance likewise the second problem, internal blocking occurs when the cards are regarded as a single switch in their entirety.

Accordingly, an object of the present invention is to provide a switch device which can be flexibly expanded from a small capacity to a large capacity regardless of a unit switch size.

A switch device of the present invention includes a switch portion including a plurality of first input ports and a plurality of first output ports, an input side port mapping portion for inputting the signals input to a plurality of second input ports to the first input port of the switch portion, an output side port mapping portion for outputting the signals output from the first output port of the switch portion from a plurality of second output ports, and a central controller for carrying out a control, which allocates the signals input to the plurality of second input ports to the first input port of the switch portion, to the input side port mapping portion, carrying out a control, which allocates the signals output from the first output port of the switch portion to a plurality of second output ports, to the output side port mapping portion, and controlling the connections between the plurality of first input ports and the plurality of first output ports of the switch portion.

A switching method of a switch device of the present invention includes a switch portion including a plurality of first input ports and a plurality of first output ports, an input side port mapping portion for inputting the signals input to a plurality of second input ports to the first input port of the switch portion, and an output side port mapping portion for outputting the signals output from the first output port of the switch portion from the plurality of second output ports, wherein the switch portion is logically divided or integrated virtually by carrying out a control, which allocates the signals input to the plurality of second input ports to the first input port of the switch portion, to the input side port mapping portion, carrying out a control, which allocates the signals output from the first output port of the switch portion to the plurality of second output ports, to the output side port mapping portion, and controlling the connections between the plurality of first input ports and the plurality of first output ports of the switch portion.

A switch control program of a switch device of the present invention includes a switch portion including a plurality of first input ports and a plurality of first output ports, an input side port mapping portion for inputting the signals input to a plurality of second input ports to the first input port of the switch portion, an output side port mapping portion for outputting the signals output from the first output port of the switch portion from a plurality of second output ports, and a central controller including at least an arithmetic processing unit and storage unit for controlling the switch portion, the input side port mapping portion, and the output side port mapping portion, wherein the arithmetic processing unit carries out a control, which allocates the signals input to the plurality of second input ports to the first input port of the switch portion, to the input side port mapping portion based on control information stored to the storage unit, the arithmetic processing unit carries out a control, which allocates the signals output from the first output port of the switch portion to a plurality of second output ports, to the output side port mapping portion based on control information stored to the storage unit, and the arithmetic processing unit controls the connections between the plurality of first input ports and the plurality of first output ports of the switch portion based on control information stored to the storage unit.

EFFECT OF THE INVENTION

According to the present invention, a switch device having an arbitrary switch capacity can be provided regardless of the capacity of a switch portion.

This is because the port mapping portions can physically virtualize ports corresponding to the division and the multiplexing of a switch.

BRIEF DESCRIPTION OF THE DRAWINGS

FIG. 4 is a block diagram showing an arrangement of a switch portion of the best mode for carrying out the invention;

FIG. 11 is a view showing a flow of a switching method according to the embodiment; and FIG. 12 is a block diagram showing an arrangement of a central controller.

REFERENCE NUMERALS

Figure 1:
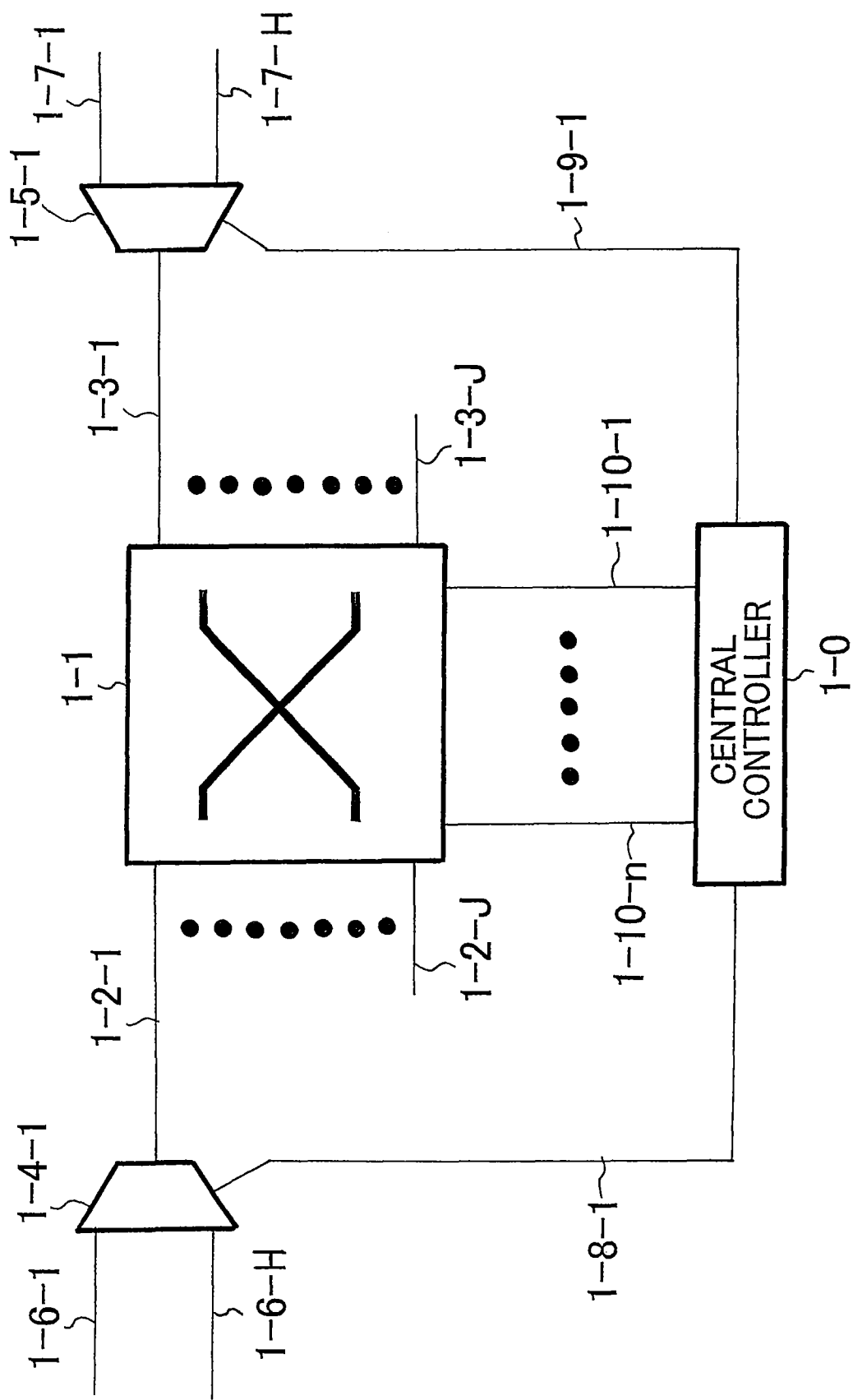
FIG. 1 is a block diagram showing an arrangement of a best mode for carrying out the invention.

1-0 central controller
1-1 switch device
1-2-1 input line of first switch device
1-2-J input line of J-th switch device
1-3-1 output line of first switch device
1-3-J output line of J-th switch device
1-4-1 first input side port mapping block
1-5-1 first output side port mapping block
1-6-1 first input line of input side port mapping block
1-7-1 first output line of output side port mapping block
1-8-1 control line of first input side port mapping block
1-9-1 control line of first output side port mapping block
1-10-1 first switch control line
1-10-$n$ n-th switch control line
2-1 input stage line card group
2-11-1 first input stage line card of input stage line card group
2-11-$k$ k-th input stage line card of input stage line card group
2-12-1 first switch of input stage line card group
2-12-$k$ k-th switch of input stage line card group
2-13-1 first input stage switch controller of input stage line card group
2-13-$k$ k-th input stage switch controller of input stage line card group
2-14-1 first output line of input stage line card group
2-14-M M-th output line of input stage line card group
2-15-1 first controller mutual connection line of input stage line card group
2-15-N N-th controller mutual connection line of input stage line card group
2-16-1 first controller-switch connection line of input stage line card group
2-16-$k$ k-th controller-switch connection line of input stage line card group
2-2 intermediate stage switch card group
2-21-1 first intermediate stage main switch card of intermediate stage switch card group
2-21-$n$ n-th intermediate stage main switch card of intermediate stage switch card group
2-22-1 first intermediate stage sub-switch card of intermediate stage switch card group
2-22-$i$ i-th intermediate stage sub-switch card of intermediate stage switch card group
2-23-1 first switch of intermediate stage switch card group
2-23-$i$ i-th switch of intermediate stage switch card group
2-24-1 first intermediate stage switch controller of intermediate stage switch card group
2-24-$n$ n-th intermediate stage switch controller of intermediate stage switch card group 2-25-1 first controller-switch connection line of intermediate stage switch card group
2-25-*i* i-th controller-switch connection line of intermediate stage switch card group
2-3 output stage line card group
2-31-1 first output stage line card of output stage line card group
2-31-*k* k-th output stage line card of output stage line card group
2-32-1 first switch of output stage line card group
2-32-*k* k-th switch of output stage line card group
2-33-1 first output stage switch controller of output stage line card group
2-33-*k* k-th output stage switch controller of output stage line card group
2-34-1 first input line of output stage line card group
2-34-M M-th input line of output stage line card group
2-35-1 first controller mutual connection line of output stage line card group
2-35-N N-th controller mutual connection line of output stage line card group
2-36-1 first controller-switch connection line of output stage line card group
2-36-*k* k-th controller-switch connection line of output stage line card group
3 stack type chassis
3-1-1 first sub-chassis of stack type chassis
3-1-*a* a-th sub-chassis of stack type chassis
3-2-1 first slot of stack type chassis
3-2-B B-th slot of stack type chassis
3-3-1 first back plane of stack type chassis
3-3-B B-th back plane of stack type chassis
3-4-1 first inter-chassis connection line of stack type chassis
3-4-*c* c-th inter-chassis connection line of stack type chassis
3-5-1 first inter-chassis connection connector group of stack type chassis
3-5-B B-th inter-chassis connection connector group of stack type chassis
3-6-1 first back plane-connector group connection line of stack type chassis
3-6-*d* d-th back plane-connector group connection line of stack type chassis
4-11-1 first logic switch
4-11-2 second logic switch
5-17-1 first redundant line of input stage line card group
5-17-L L-th redundant line of input stage line card group
5-37-1 first redundant line of output stage line card group
5-37-L L-th redundant line of output stage line card group
6-0-1 multiplexing device card
6-0-2 separating device card

BEST MODE FOR CARRYING OUT THE INVENTION

Next, a best mode for carrying out the invention will be explained in detail with reference to the drawings.

FIG. 1 is a block diagram showing an arrangement of a switch device of the present invention.

P pieces of input port mapping blocks 1-4-1 to 1-4-P (or selectors) are connected to input lines 1-2-1 to 1-2-J connected to J pieces of input ports of a switch portion 1-1, respectively (FIG. 1 shows only the input port mapping block 1-4-1 and omits the input port mapping blocks 1-4-2 to 1-4-P). Each of the input port mapping blocks 1-4-1 to 1-4-P has H pieces of input ports which are connected to input lines 1-6-1 to 1-6-H, respectively.

P pieces of output port mapping blocks 1-5-1 to 1-5-P (or selectors) are connected to output lines 1-3-1 to 1-3-J connected to J pieces of output ports of the switch portion 1-1, respectively (FIG. 1 shows only the output port mapping block 1-5-1 and omits the output port mapping blocks 1-5-2 to 1-5-P). Each of the input port mapping blocks 1-5-1 to 1-5-P has H pieces of output ports which are connected to output lines 1-7-1 to 1-7-H, respectively.

Further, the input port mapping blocks 1-4-1 to 1-4-P and the output port mapping blocks 1-5-1 to 1-5-P are connected through a switch virtualization controller (central controller) 1-0, connection lines 1-8-1 to 1-8-P (FIG. 1 shows only the connection line 1-8-1 and omits the connection lines 1-8-2 to 1-8-P) and connection lines 1-9-1 to 1-9-P (FIG. 1 shows only the connection line 1-9-1 and omits the connection lines 1-9-2 to 1-9-P), respectively.

Each of the input port mapping blocks is a portion for physically multiplexing the port, and each of the output port mapping blocks is a portion for physically separating the port. The input port mapping block transmits the transmission signal of an appropriate port thereof out of transmission signals input to a plurality of input ports thereof, to the input port of the switch portion 1-1 according to a control signal from the central controller. The output port mapping block transmits a signal, which is output from the switch portion 1-1 and input to an input port thereof, to an appropriate output port of a plurality of output ports thereof according to a control signal from the central controller. Hereinafter, the input port mapping block will be explained as an example by using FIGS. 2A and 2B.

Although explanation of the arrangement and the operation of the output port mapping block is omitted, it is used to carry out separating which is inverse to multiplexing.

Figure 2A:
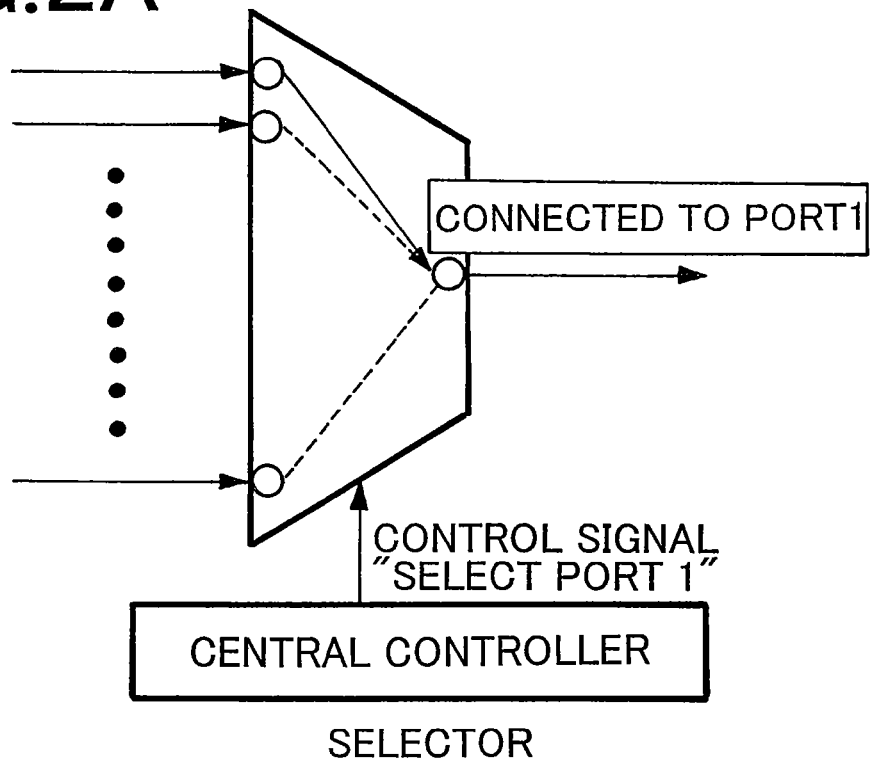
FIGS. 2A and 2B are views showing arrangements of port mapping blocks.
Figure 2B:
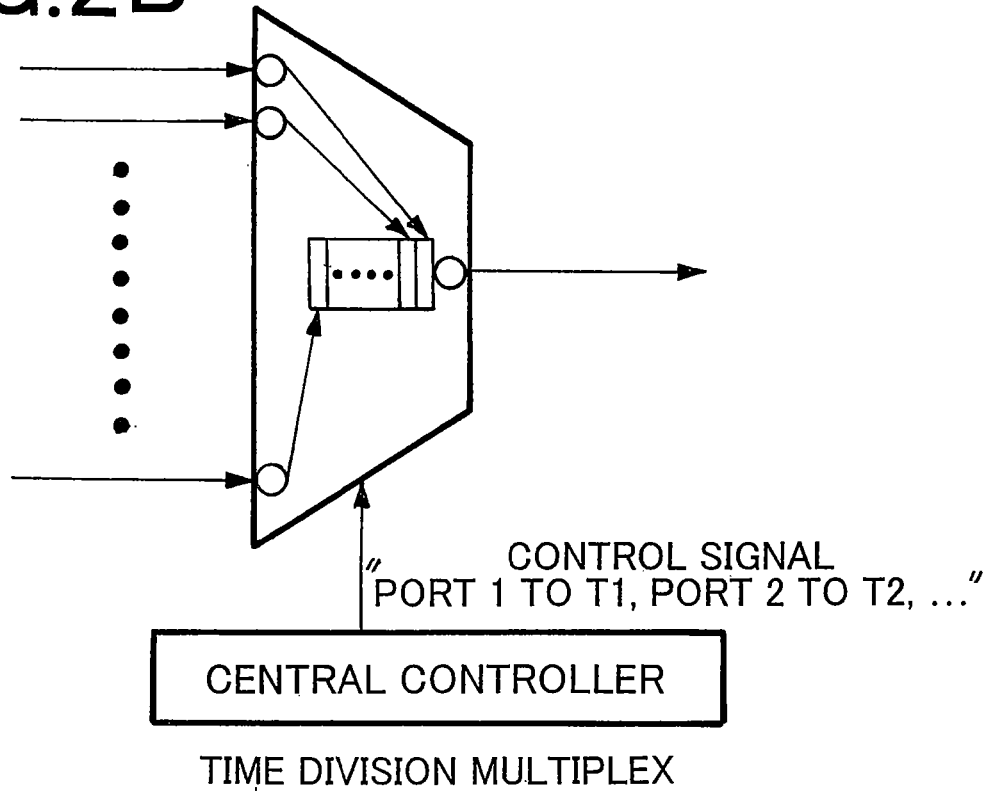

As the input port mapping block, there are, for example, a selector as shown in FIG. 2A and a time-shared multiplexing device as shown in FIG. 2B.

In the selector shown in FIG. 2A, logical division-setting information is previously notified to the central controller, the central controller transmits a control signal indicating which input port of the port mapping block is to be selected according to the information, the port mapping block picks out a transmission signal of the selected input port according to the control signal and transmits it to the input port of a connected input line card.

In the time-shared multiplexing device shown in FIG. 2B, logical division setting-information is previously notified to the central controller, the central controller transmits a control signal, which indicates which input port is to be allocated to which time slot, to the port mapping block, the port mapping block sets a transmission signal in the time slot according to the control signal and transmits it to the input port of a connected input line card.

Operation of virtual logical division carried out by the switch device will be explained with reference to FIGS. 3A and 3B. A case that a switch portion 4-1 having a 8×8 switch is virtually logically divided into a 6×6 logic switch portion 4-11-1 and a 4×4 logic switch portion 4-11-2 as shown in FIG. 3B is taken up.

Figure 3A:
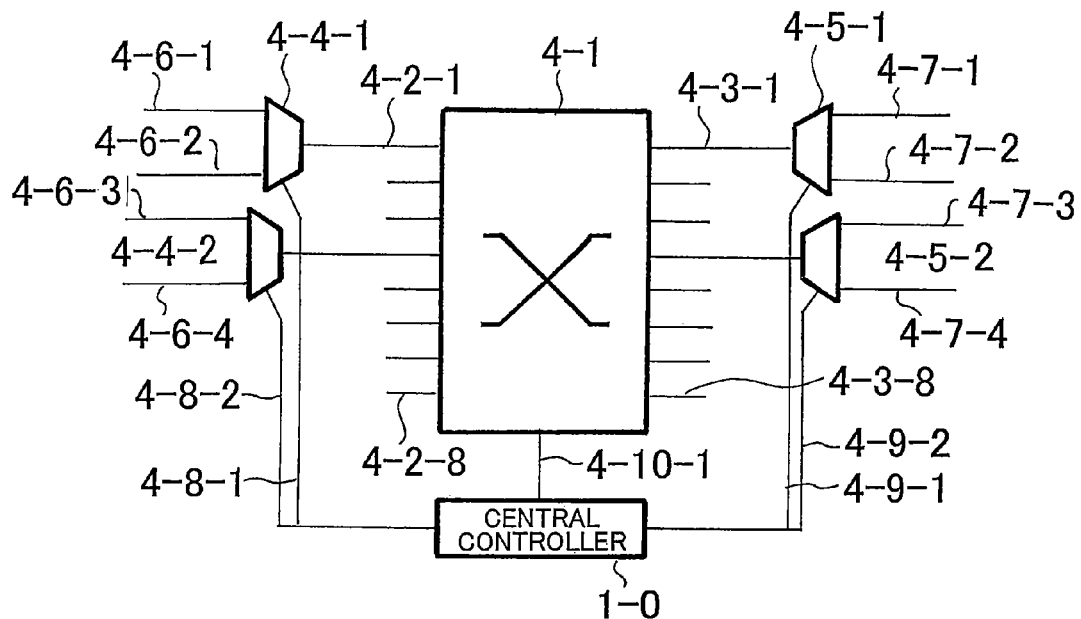
FIGS. 3A and 3B are views explaining logical division in the best mode for carrying out the invention.
Figure 3B:
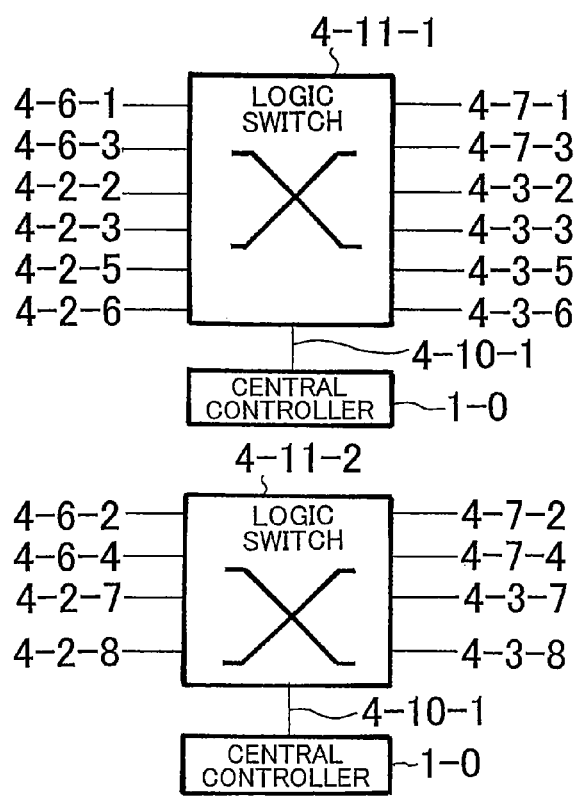

As shown in FIG. 3A, an input side port mapping block 4-4-1 having input lines 4-6-1, 4-6-2 are connected to an input line 4-2-1 of the 8×8 switch portion 4-1, and further an input side port mapping block 4-4-2 having input lines 4-6-3, 4-6-4 is connected to an input line 4-2-4 of the switch portion 4-1. An output side port mapping block 4-5-1 having output lines 4-7-1, 4-7-2 is connected to an output line 4-3-1 of the switch portion 4-1, and further an output side port mapping block 4-5-2 having output lines 4-7-3, 4-7-4 is connected to an output line 4-3-4 of the switch portion 4-1.

The input side port mapping blocks 4-4-1, 4-4-2 and the output side port mapping block 4-5-1,4-5-2 are connected to a switch virtualization controller (the central controller) 1-0 through connection lines 4-8-1,4-8-2, and connection lines 4-9-1, 4-9-2. The switch virtualization controller 1-0 sends control signals to the input side port mapping blocks 4-4-1, 4-4-2 to select any of two input lines of each of the input side port mapping blocks 4-4-1, 4-4-2 and sends control signals to the output side port mapping block 4-5-1, 4-5-2 to select any of two input lines of each of the output side port mapping block 4-5-1, 4-5-2.

To construct the 6×6 logic switch portion 4-11-1, the switch virtualization controller (the central controller) 1-0 sends a control signal to the input side port mapping block 4-4-1 to select the input line 4-6-1, sends a control signal to the input side port mapping block 4-4-2 to select the input line 4-6-3, sends a control signal to the output side port mapping block 4-5-1 to select the output line 4-7-1, and sends a control signal to the output side port mapping block 4-5-2 to select the output line 4-7-3. Then, the switch virtualization controller (the central controller) 1-0 sends a control signal to the switch portion, allocates the input lines 4-2-1 to 4-2-6 as input lines of the switch portion, and allocates the output lines 4-3-1 to 4-3-6 as output lines of the switch portion. With this arrangement, the input lines 4-6-1, 4-6-3, 4-2-2,4-2-3,4-2-5,4-2-6 are allocated to the input lines of the 6×6 logic the switch portion 4-11-1 shown in FIG. 3B, and the output lines 4-7-1, 4-7-3, 4-3-2, 4-3-3, 4-3-5, 4-3-6 are allocated to the output lines thereof.

To construct the 4×4 logic switch portion 4-11-2, the switch virtualization controller (the central controller) 1-0 sends a control signal to the input side port mapping block 4-4-1 to select the input line 4-6-2, sends a control signal to the input side port mapping block 4-4-2 to select the input line 4-6-4, sends a control signal to the output side port mapping block 4-5-1 to select the output line 4-7-2, and sends a control signal to the output side port mapping block 4-5-2 to selecting the output line 4-7-4. Then, the switch virtualization controller (the central controller) 1-0 sends a control signal to the switch portion, allocates the input lines 4-2-1, 4-2-4, 4-2-7, 4-2-8 as the input lines of the switch portion, and allocates the output lines 4-3-1, 4-3-4, 4-3-7, 4-3-8 as output lines of the switch portion. With this arrangement, the input lines 4-6-2, 4-6-4, 4-2-7, 4-2-8 are allocated to the input lines of the 4×4 logic switch portion 4-11-2 shown in FIG. 3B, and the output lines 4-7-2, 4-7-4, 4-3-7, 4-3-8 are allocated to the output lines thereof. As a result, the switch portion 4-1 having 8×8 switches are virtually logically divided into the 6×6 logic switch portion 4-11-1 and the 4×4 logic switch portion 4-11-2. With this arrangement, the switch portion 4-1 can be logically divided into a plurality of switch portions having a capacity smaller than a physical switch capacity.

Although the case that the input side port mapping blocks and the output side port mapping blocks are connected to the two input ports and the two output ports of the switch portion here, they may be connected to more than two input and more than two output ports.

It is needless to say that the input side port mapping blocks and the output side port mapping blocks may be connected to all the input ports and all the output ports. In this case, the switch portion 4-1 having the 8×8 switch can be virtually logically divided into two switch portions each having 8×8 switch having the same physical switch capacity.

FIG. 11 is shows a flow of a switching method according to the embodiment. As shown in FIG. 11, first, when it is instructed to the central controller to set the logical division, the central controller instructs the input side port mapping blocks and the output side port mapping blocks which input ports of the plurality of input ports are to be allocated and further sets connection paths between the input ports and the output ports of the switch portion as explained by using FIGS. 3A and 3B. The connection paths between the input ports and the output ports of the switch portion may be set before the input side port mapping block and the output side port mapping blocks are controlled.

Although the operation of the virtual logical division is explained above, it is needless to say that a 8×8 switch can be constructed by virtually logically integrating a 4×4 logic switch and a 6×6 logic switch, which are logically divided, inversely.

The switch portion 1-1 may use a three-stage switch composed of an input stage, an intermediate stage, and an output stage as shown in FIG. 4, it may have four or more switch stages or may be composed of one or two switch stages.

EFFECT OF THE EMBODIMENT

Since the embodiment includes the logically dividing and logically integrating means and can provide any arbitrary switch size, it can provide a virtual switch having switch capacity whose unit is equal to or less than a unit switch size.

Example 1

FIG. 4 is a view showing a case in which the switch portion 1-1 of the switch device is composed of a three-stage switch. The switch portion 1-1 is composed of an input stage line card group 2-1, an intermediate stage switch card group 2-2, and an output stage switch group 2-3.

The input stage line card group 2-1 is composed of k pieces of line cards 2-11-1 to 2-11-$k$ including J pieces of input lines 1-2-1 to 1-2-J (J=k×h) connected to J pieces of input ports and M pieces of output lines 2-14-1 to 2-14-M (M=k×i, i=m×n) connected to M pieces of output ports. The respective line cards 2-11-1 to 2-11-$k$ include k pieces of input stage switches 2-12-1 to 2-12-$k$ (each constructing a unit switch) having an h×i switch size, k pieces of input stage switch controllers 2-13-1 to 2-13-$k$, N pieces of controller mutual connection lines 2-15-1 to 2-15-N (N=k×n), and k pieces of controller-switch connection lines 2-16-1 to 2-16-$k$ for connecting the input switch controllers 2-13-1 to 2-13-$k$ to the input stage switches 2-12-1 to 2-12-$k$.

The intermediate stage switch card group 2-2 has n pieces of main switch cards 2-21-1 to 2-21-$n$ including input ports connected to output lines 2-14-1 to 2-14-M of the input stage line card group 2-1. The respective main switch cards 2-21-1 to 2-21-$n$ include i pieces of sub-switch cards 2-22-1 to 2-22-$i$ including i pieces of intermediate stage switches (each constructing a unit switch) 2-23-1 to 2-23-$i$ having a k×k switch size, and n pieces of intermediate stage switch controllers 2-24-1 to 2-24-$n$ connected to the controller mutual connection lines 2-15-1 to 2-15-N of the input stage line card group 2-1 and to controller mutual connection lines 2-35-1 to 2-35-N of the output line card group 2-3. The intermediate stage switch controllers 2-24-1 to 2-24-$n$ further include n pieces of controller-central controller connection lines 1-10-1 to 1-10-$n$ through which they are connected to a central controller 1-0 and i pieces of controller-switch connection lines 2-25-1 to 2-25-$i$ for connecting the respective intermediate stage switches 2-23-1 to 2-23-$i$ to the intermediate stage switch controllers 2-24-1 to 2-24-$n$.

The output stage line card group 2-3 includes M pieces of input lines 2-34-1 to 2-34-M for connecting the output ports of the intermediate stage switch card group 2-2 to the input ports of output stage line cards 2-31-1 to 2-31-$k$ and k pieces of the output stage line cards 2-31-1 to 2-31-$k$ having J pieces of output lines 1-3-1 to 1-3-J. The respective output stage line cards 2-31-1 to 2-31-$k$ include k pieces of output stage switches 2-32-1 to 2-32-$k$ (each constructing a unit switch) having an i×h switch size, the k pieces of output stage switch controllers 2-33-1 to 2-33-$k$, N pieces of the controller mutual connection lines 2-35-1 to 2-35-N, and k pieces of controller-switch connection lines 2-36-1 to 2-36-$k$ for connecting the output stage switch controllers 2-33-1 to 2-33-$k$ to the output stage switches 2-32-1 to 2-32-$k$.

The central controller 1-0 is connected to the intermediate stage switch controllers 2-24-1 to 2-24-$n$ of the main switch cards 2-21-1 to 2-21-$n$ in the intermediate stage switch card group 2-2. The intermediate stage switch controllers 2-24-1 to 2-24-$n$ are connected to the input stage switch controllers 2-13-1 to 2-13-$k$ and to the output stage switch controller 2-33-1 to 2-33-$k$. The central controller 1-0 sends a control signal to the intermediate stage switch controllers 2-24-1 to 2-24-$n$ and further sends a control signal to the input stage switch controllers 2-13-1 to 2-13-$k$ and to the output stage switch controller 2-33-1 to 2-33-$k$ through the intermediate stage switch controllers 2-24-1 to 2-24-$n$, and controls the switches of the input stage line cards, the switches of the intermediate stage sub-switch cards, and the switches of the output stage line cards. As a result, connection of paths is set, changed, and removed between the input ports and the output ports of the switch portion 1-1.

Since the connection paths are controlled through the wirings for connecting the central controller to the controllers and the wirings for connecting the controllers to each other, the number of connection lines can be reduced as compared with a case that the central controllers are connected to all the controllers. It is needless to say that the central controller may be connected to all the controllers.

As already described, logical division into a plurality of switches and logical integration of divided switches can be carried out by connecting the input side port mapping blocks and the output side port mapping blocks. In this case, a switch capacity can be increased in a switch unit of a line card by employing switches which can expand the number of input ports of the switch portion by additionally providing the switch portion with the line cards of the input stage, the intermediate stage, and the output stage, connecting the input side port mapping blocks to the input side of the input stage line card group 2-1, and connecting the output side port mapping blocks to the output side of the output stage line card group 2-3. Further, arbitrary switch capacity can be set regardless of a switch capacity of a line card by carrying out the logical division and the logical integration between a plurality of line cards.

Example 2

Next, there will be explained an arrangement which can exhibit a good performance even if a plurality of switch groups are integrated and handled as a single large capacity switch when the above switch device is arranged by a stack structure.

Figure 5:
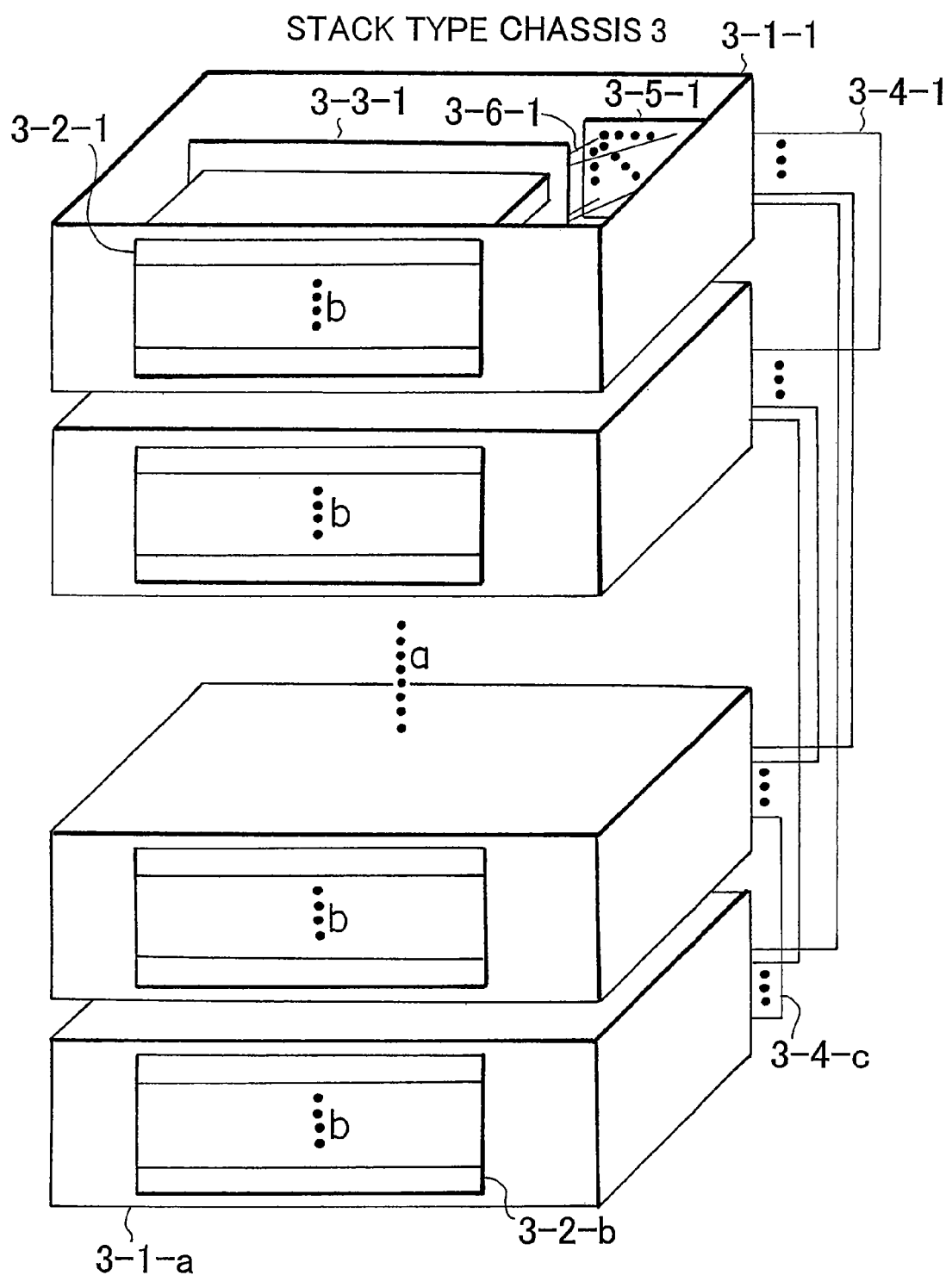
FIG. 5 is a block diagram showing an arrangement of a stack type chassis of the best mode for carrying out the invention.

FIG. 5 is a view showing an arrangement of an example 2 of the present invention and shows a stack type chassis for accommodating cards. Referring to FIG. 5, the stack type chassis 3 according to the example 2 includes a pieces of sub-chassis 3-1-1 to 3-1-$a$. The respective sub-chassis include B pieces of slots 3-2-1 to 3-2-B (B=2k+n) for accommodating input stage line cards 2-11-1 to 2-11-$k$, output stage line cards 2-31-1 to 2-31-$k$, or intermediate stage switch cards 2-21-1 to 2-21-$n$. Further, the respective sub-chassis include B pieces of back planes 3-3-1 to 3-3-B for connecting b pieces of the input stage line cards 2-11-1 to 2-11-$k$, the output stage line cards 2-31-1 to 2-31-$k$, or the intermediate stage switch cards 2-21-1 to 2-21-$n$ in one sub-chassis, and B pieces of inter-chassis connection connector groups 3-5-1 to 3-5-B including C pieces of inter-chassis mutual connection lines 3-4-1 to 3-4-C (C=2M+2N+i) from the B pieces of the back planes 3-3-1 to 3-3-B. The B pieces of the back planes 3-3-1 to 3-3-B are connected to the B pieces of the inter-chassis connection connector groups 3-5-1 to 3-5-B through d pieces of back plane-connector group connection lines 3-6-1 to 3-6-$d$.

Next, respective portions in FIGS. 4 and 5 will be explained in detail. Each of the input stage switches 2-12-1 to 2-12-$k$ of the input stage line card group 2-1 is composed of an input buffer type switch, each of the intermediate stage switches 2-23-1 to 2-23-$i$ of the intermediate stage switch card group 2-2 is composed of a bufferless switch, and each of the output stage switches 2-32-1 to 2-32-$k$ of the output stage line card group 2-3 is composed of an output buffer type switch. When the switches are disposed as described above, the mounting area of the intermediate stage switch cards can be reduced and the switch capacity of intermediate stage switch per card can be increased. Since the intermediate stage switch cards only cause signals to pass therethrough, it is not always necessary to provide them with buffers and thus they can employ the bufferless switches. Since the number of intermediate stage switches are larger than those of input stage switches and output stage switches, it is effective to reduce the number of the cards to increase the switch capacity of the intermediate stage switches per card.

Further, an optical connection transceiver is mounted on each of the input stage switches 2-12-1 to 2-12-$k$, the intermediate stage switches 2-23-1 to 2-23-$i$, the output stage switches 2-32-1 to 2-32-$k$, the input stage switch controllers 2-13-1 to 2-13-$k$, the intermediate stage switch controllers 2-24-1 to 2-24-$n$, the output stage switch controllers 2-33-1 to 2-33-$k$, and the central controller 1-0. The output lines 2-14-1 to 2-14-M of the input stage line card group and the controller mutual connection lines 2-15-1 to 2-15-N, the input lines 2-34-1 to 2-34-M of the output stage line card group and the controller mutual connection lines 2-35-1 to 2-35-N, and the controller-central controller connection lines 1-10-1 to 1-10-$n$ are connected through optical wirings. These optical wirings are connected to the back planes 3-3-1 to 3-3-B in the sub-chassis. The connection lines 3-6-1 to 3-6-$d$ of the back plane-connector groups are also composed of optical wirings and connected to the inter-chassis connection connector groups. The inter-chassis mutual connection lines 3-4-1 to 3-4-$c$ are also composed of optical wirings and connect between the respective chassis mutually. When the optical connection is carried out in the insides of the chassis and between the chassis and thus boundaries can be removed in and between the chassis (wirings can be connected without being terminated), a switch device constructed by logically integrating a plurality of chassis can be managed as if it were an ordinary single chassis. Since the switch device is composed of the plurality of chassis, restriction to scalability can be eased. Further, since the optical wirings are employed, the number of wirings can be reduced than that of conventional electric wirings.

Although a typical example is exemplified above so that the present invention can be explained easily, switches having any arbitrary size can be logically divided into arbitrary size by using arbitrary numbers of input and output port mapping blocks even in an arrangement other than the above arrangement, and thus the present invention is not limited to the above arrangement.

In the example 2, since the chassis are mutually connected optically inside and outside thereof and further the switch controllers are also optically connected mutually inside and outside of the chassis, the plurality of switch cards disposed in the plurality of chassis can be logically integrated and handled as a single large switch device, thereby a large capacity switch can be provided. Further, a switch capacity can be easily expended by constructing the switch device as the multi-stage switch by separately mounting the input stage line card, the switch card, and the output stage line card. Accordingly, there can be provided a switch device that can be arbitrarily expanded from a small capacity to a large capacity.

Further, since the large capacity optical connection is employed for connection between the chassis, there can be realized a band similar to or more than that of connection in the chassis even if a connecting distance is long as in a connecting distance between the cards and between the chassis.

Example 3

Figure 6:
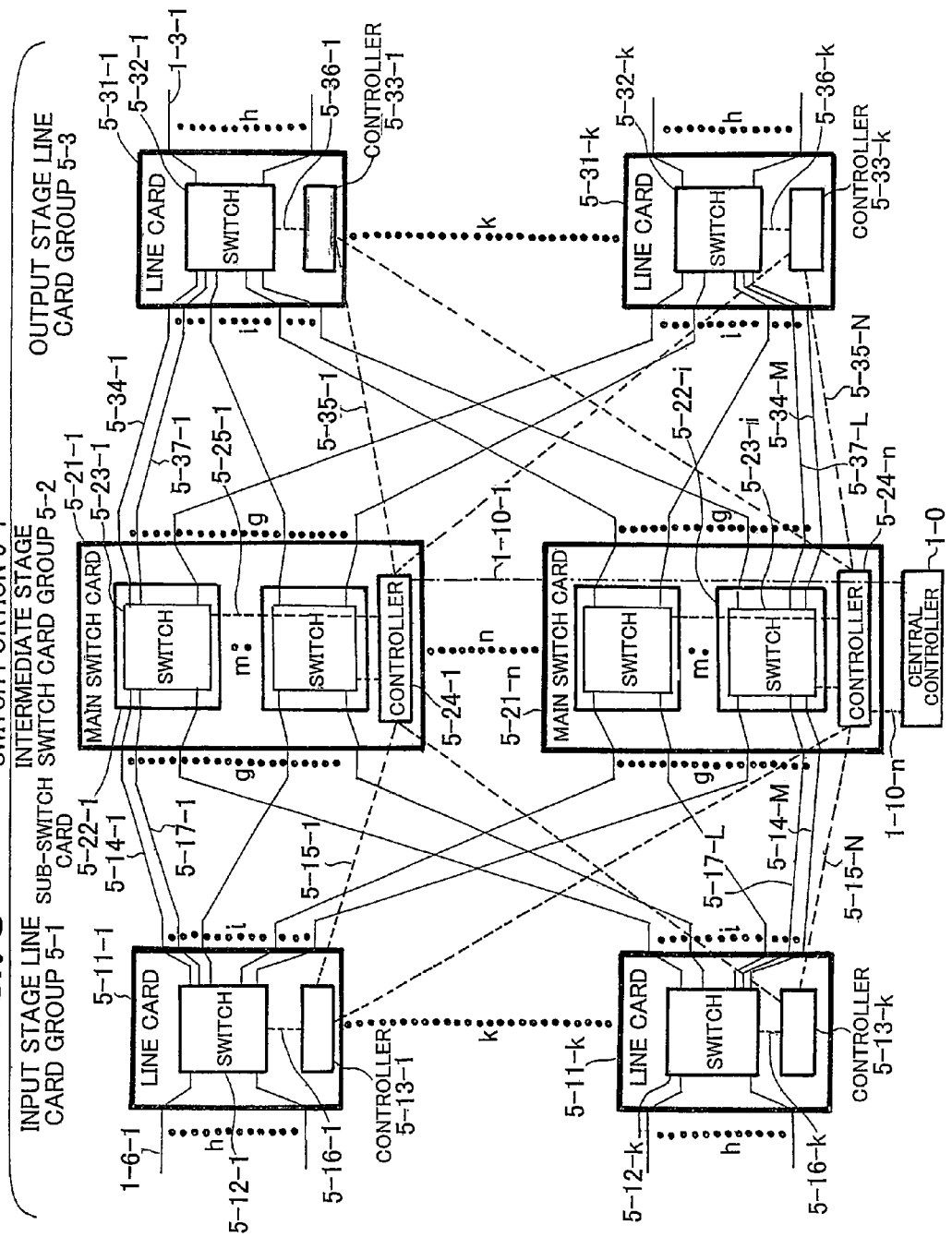
FIG. 6 is a block diagram showing an arrangement of a switch portion of another best mode for carrying out the invention.

Next, a third example of the present invention will be explained. FIG. 6 shows a block diagram of a switch device in which lines are made redundant by using redundant output lines 5-17-1 to 5-17-L of an input stage line card group and redundant input lines 5-37-1 to 5-37-L of an output stage line card group in the switch device 1-1 shown in FIG. 2. A central controller preferentially allocates these redundant lines to logically divided switches. Explanation of the respective components shown in FIG. 6 is omitted because they are the same as those of FIG. 4 except the redundant output lines 5-17-1 to 5-17-L and the redundant input lines 5-37-1 to 5-37-L, that is, respective components 1-6-1, 5-11-1 to 5-36-$k$ in FIG. 6 are the same as the respective components 1-2-1, 2-11-1 to 2-36-$k$ of FIG. 4.

In a maximum arrangement, twenty-four input (output) line cards are used, each line card includes sixteen input (output) ports, three intermediate stage main switch cards (one of them is a spare card) are used, each main switch card includes eight sub-switch cards (twenty-four sub-switch cards in total), and the respective input (output) line cards are connected to the respective sub-switch cards through one mutual connection line. As a result, a switch on the input line card has twenty-four output ports, and a switch on the output line cards has twenty-four ports (refer to FIG. 7).

When logical division is carried out, the number of the input (output) line cards and the number of the sub-switch cards are smaller than those in the maximum arrangement. Accordingly, when each one input (output) line card is connected to each one sub-switch card one by one in connection lines, there are empty mutual connection line ports. Thus, it is possible to compensate a transmission capacity reduced by the logical division (when ports are logically divided into ½, the transmission capacity of the logically divided ports is reduced to ½, and when ports are logically divided into ⅓, the transmission capacity of the logically divided ports is reduced to ⅓) by redundantly connecting the empty mutual connection lines and allocating the redundant mutual connection lines to logically divided ports.

Specifically, when an arrangement including one input stage line card, one main switch card, and three sub-switch cards are taken into consideration, connection between line card and sub-switch cards is carried out such that connection to a sub-switch card 6-26-1 is carried out through twelve redundant mutual connection lines and connection to each of sub-switch cards 6-26-2 and 6-26-3 is carried out through six redundant mutual connection lines. The capacity reduced by the logical division can be compensated by controlling input stage switch on input stage line card by a central controller so that the signal from an input stage switch used by the input port of the logically divided line card is preferentially supplied to the sub-switch card 6-26-1. Output stage line card is connected to the sub-switch cards by redundant mutual connection lines likewise.

In the embodiment, when the logical division is carried out by employing the arrangement of the third example, the switch capacity can be allocated more flexibly.

In the respective examples, although the case, in which the three-stage switch composed of the input stage, the intermediate stage, and the output stage are used, is explained, the examples may have four or more switch stages as described above.

Example 4

Figure 7:
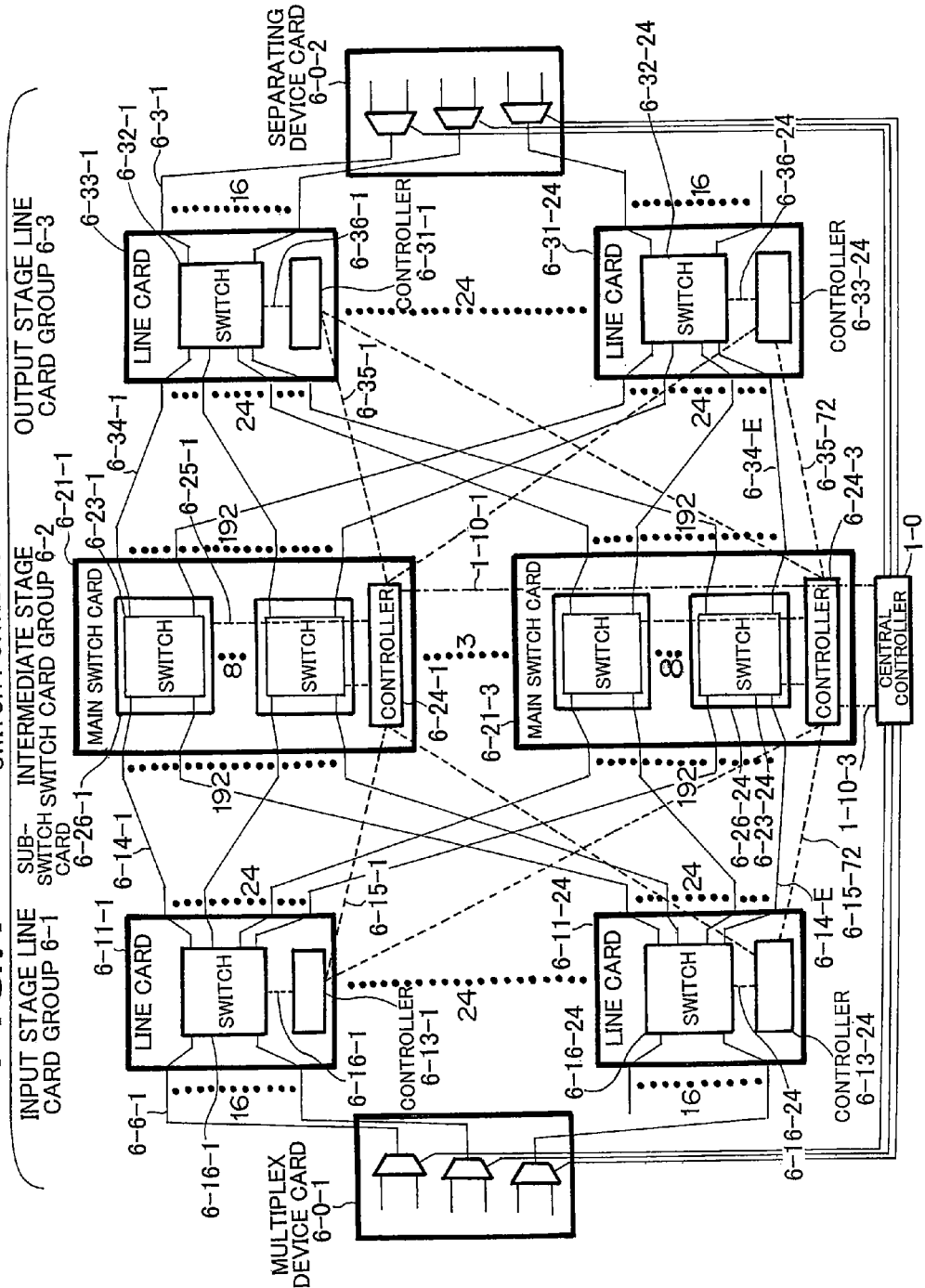
FIG. 7 is an arrangement view of a switch device for explaining a first embodiment of the invention.
Figure 8:
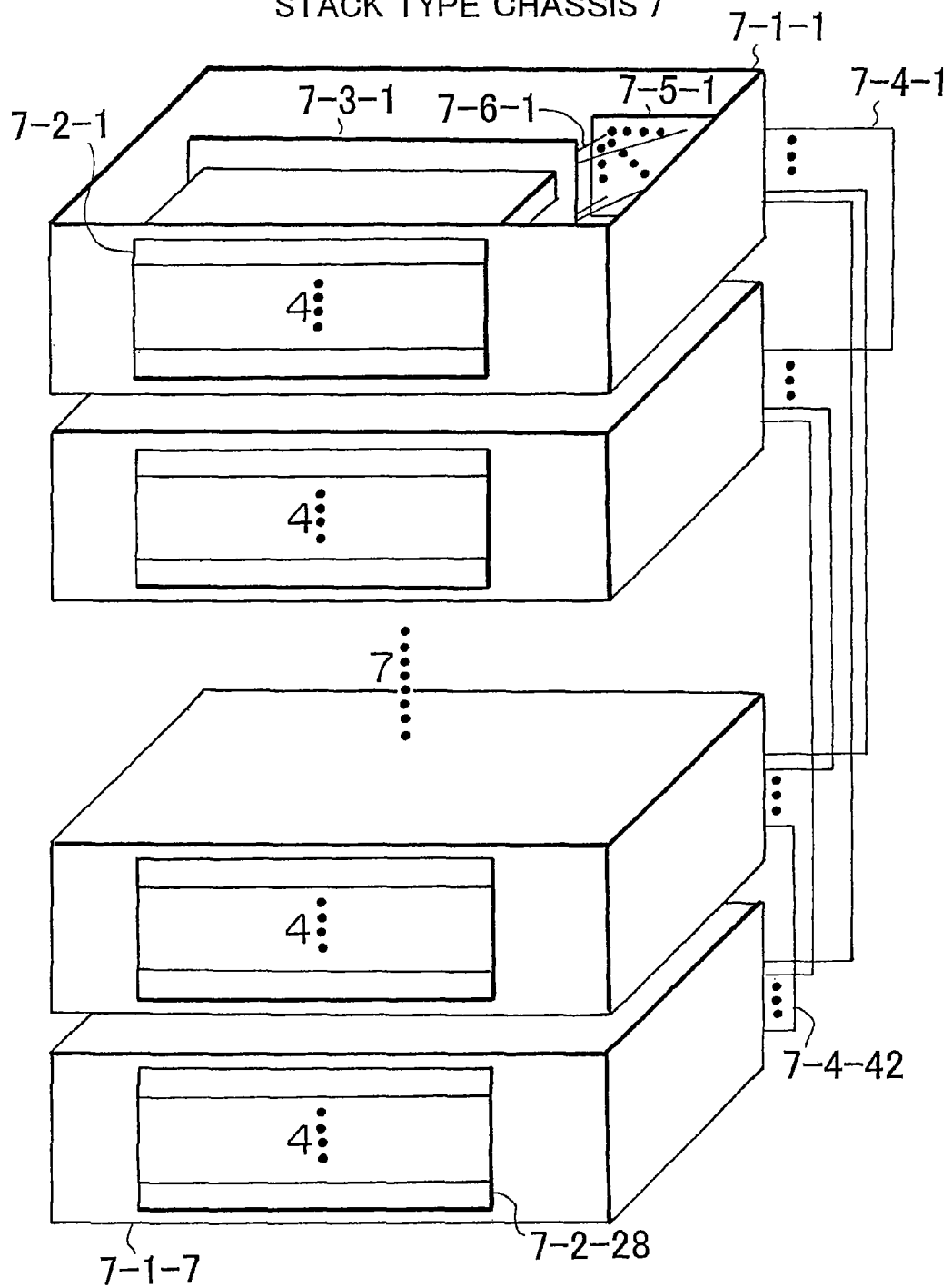
FIG. 8 is an arrangement view of a stack type chassis for explaining the first embodiment of the invention.

Next, a fourth example of the present invention will be explained using FIGS. 7 and 8. The example 4 corresponds to a first embodiment of the present invention. Respective components 6-6-1, 6-11-1 to 5-36-24 shown in FIG. 7 correspond to the respective components 1-2-1, 2-11-1 to 2-36-$k$ of FIG. 4 and are the same components as those of FIG. 4 except that the numbers of them are set to k=24, g=192, m=8, n=3, h=16, i=24, N=72, M=E in FIG. 7. Further, respective components 7-1-1 to 7-6-1 shown in FIG. 8 correspond to the respective components 3-1-1 to 3-6-1 of FIG. 5 and are the same components as those of FIG. 5 except that the numbers of them are set to a=7, b=4, c=42, B=28 in FIG. 8.

In the example 4, input port mapping blocks and output port mapping blocks are composed of multiplexing device cards 6-0-1 and separating device cards 6-0-2 and accommodated in certain slots of sub-chassis 7-1-1 to 7-1-7. Each of input stage line cards and output stage line cards is composed of one line card. One input stage line card has sixteen input lines each having a transmission capacity of 10 Gbps and twenty-four output lines each having a transmission capacity of 10 Gbps, and an input stage switch is composed an input buffer type switch having a switch capacity of 160 Gbps. One output stage line card has twenty-four input lines each having a transmission capacity of 10 Gbps and sixteen output lines each having a transmission capacity of 10 Gbps, and an output stage switch is composed an output buffer type switch.

A maximum of eight sub-switch cards can be mounted on each of intermediate stage switch cards, and a bufferless cross bar switch is used as an intermediate stage switch. In a maximum arrangement, three intermediate stage switch cards are used with two of them acting as active cards and one of them acting as a standby card. One sub-switch card has twenty-four input/output ports and a switch capacity of 240 Gbps. In the maximum arrangement, the switch capacity is set to 240 Gbps×8×2=3.84 Tbps.

Each of the sub-chassis 7-1-1 to 7-1-7 has a 2 U size and has four slots so that four cards can be accommodated. In the maximum arrangement, seven sub-chassis are stacked so that twenty-eight slots are used.

An optical connection transceiver is mounted on each of input stage switches, intermediate stage switches, output stage switches, input stage switch controllers, intermediate stage switch controllers, output stage switch controllers, and a central controller. Wirings between the output lines of an input stage line card group and controller mutual connection lines, between the input lines of an output stage line card group and the controller mutual connection lines, and between the controllers and central controller connection lines are composed of optical wirings. These optical wirings are connected to back planes in the sub-chassis. Connection lines between the back planes and connector groups are also composed of optical wirings and connect the respective chassis each other. The inter-chassis mutual connection lines are also composed of optical fibers and connects between the respective chassis mutually.

With this arrangement, a switch device of a maximum 3.84 T can be provided by starting from an arbitrary small capacity obtained by logical division and stacking (connecting) a plurality of chassis. Since the sub-chassis have a small size, a switch with a small number of empty slots in the chassis can be economically provided even if the capacity of the switch is small at the beginning. Further, since multi-stage switches can be optimally disposed without being restricted in mounting so that they have a minimum overall area by port mapping blocks and large capacity-optical connection, a large capacity switch can be provided while saving a space.

Example 5

Figure 9:
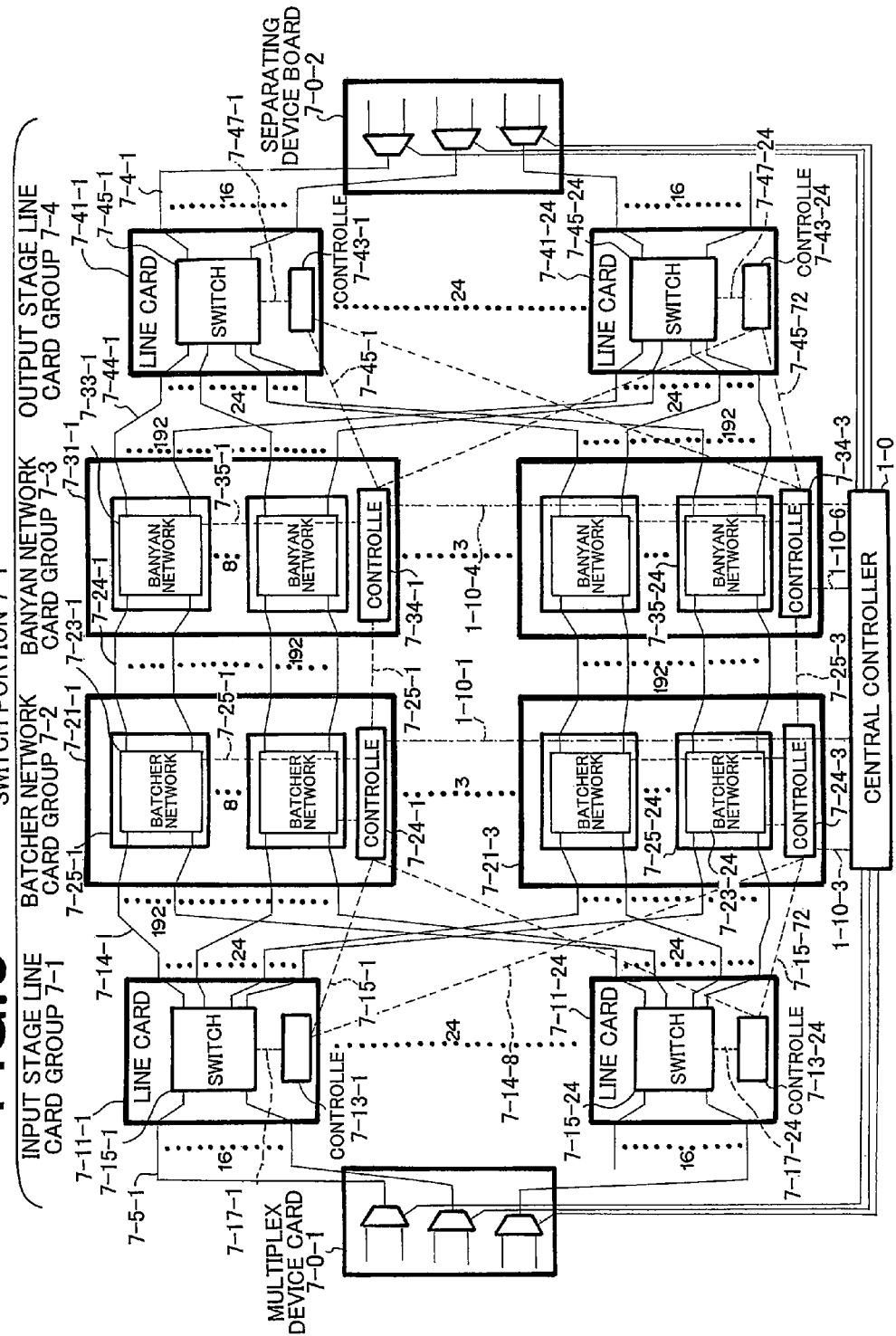
FIG. 9 is a block diagram showing an arrangement of a switch portion of still another best mode for carrying out the invention.
Figure 10:
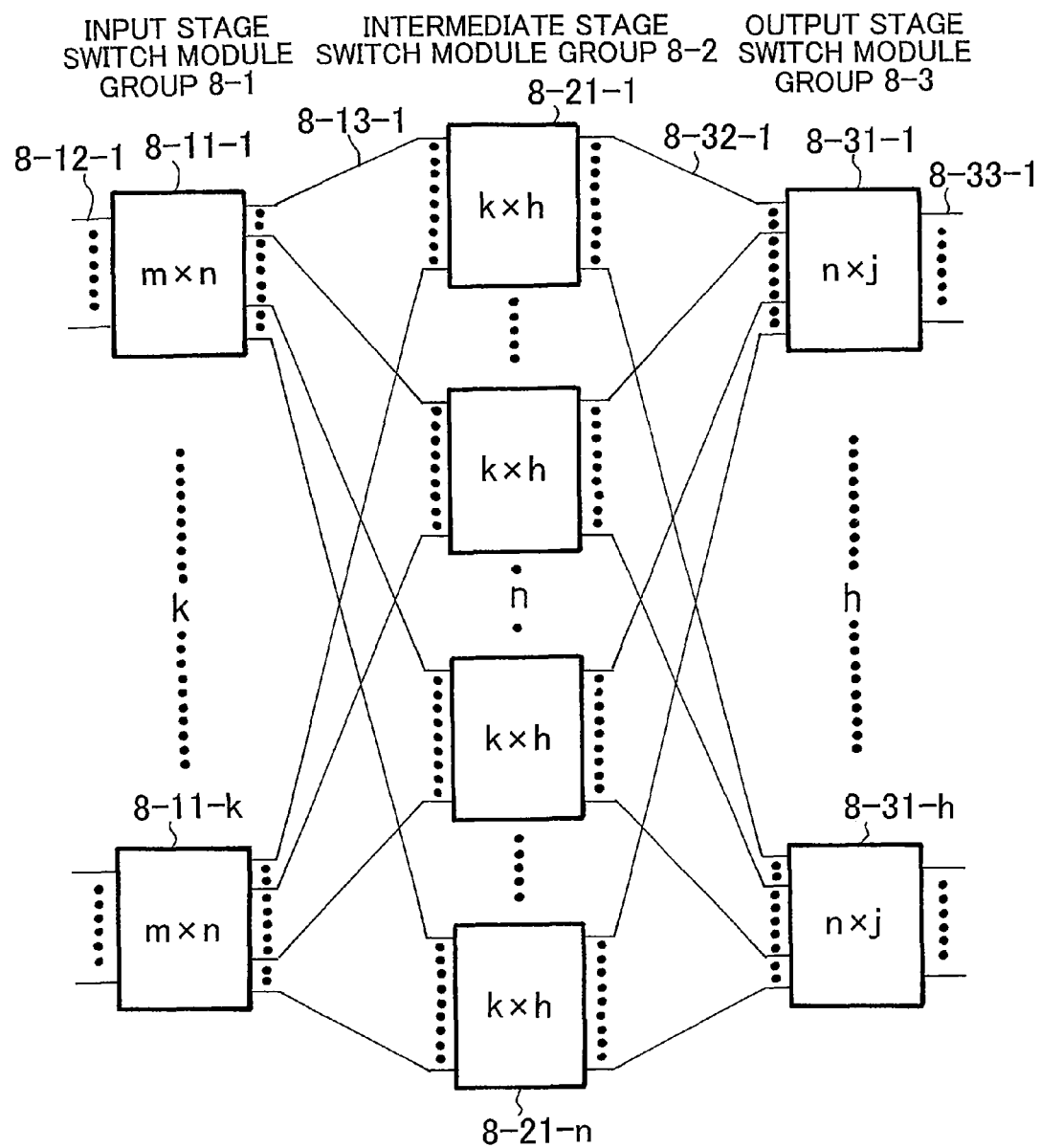
FIG. 10 is a block diagram showing a conventional multi-stage switch.

FIG. 9 shows a four-stage arrangement as an example 5 of the present invention. In the example 5, the intermediate stage switch card group 6-2 shown in FIG. 7 is replaced with Batcher network card groups 7-2 and 7-3.

The example 5 is composed of a first stage input buffer switch, a second stage Butcher network switch, a third stage Banyan network switch, and a four stage output buffer switch. The second and third stages are composed of bufferless switches and can carry out self-routing by causing a self-format to correspond to Batcher/Banyan.

Since the example 5 is composed of the four-stage arrangement as described above, an intermediate stage unit switch can be arranged simply, from which an advantage of high speed switching can be obtained. JP-A-8-167909 discloses a switch having the four-stage arrangement.

In all the examples described above, it is possible to carry out the switch processing of the central controller by software. FIG. 12 is a block diagram showing an arrangement of the central controller. The switch processing can be carried out by software when the central controller 10 is composed of a CPU 11 acting as an arithmetic operation/processing unit, a storage unit such as a RAM 13 for storing control information, a storage unit such as a ROM 12 for storing a switch control program in which a flow of FIG. 11 is described (connection paths between input/output ports of a switch portion may be set before input side port mapping blocks and output side port mapping blocks are controlled). The switch portion can be logically divided virtually in, for example, such a manner that connection path information between a plurality of second input ports of an input side port mapping portion and a plurality of second output ports of an output side port mapping portion which are disposed across the switch portion is stored to the RAM 13 as control information, and the CPU 11 carries out a control, which allocates the signals input to the plurality of second input ports to first input port of the switch portion, to the input side port mapping portion based on the control information stored to the RAM 13, carries out a control, which allocates the signals output from first output ports of the switch portion to the plurality of second output ports, to the output side port mapping portion based on the control information stored to the RAM 13, and controls the connections between the plurality of first input ports and the plurality of first output ports of the switch portion based on the control information stored to the RAM 13.

The invention claimed is:

1. A switch device comprising:
   a switch portion including a plurality of first input ports and a plurality of first output ports;
   an input side port mapping portion for inputting the signals input to a plurality of second input ports to the first input port of the switch portion through one third output port, the input side port mapping portion including the plurality of second input ports and the one third output port;
   an output side port mapping portion for outputting the signals output from the first output port of the switch portion from a plurality of second output ports through one third input port, the output side port mapping portion including the plurality of second output ports and the one third input port; and
   a central controller for carrying out a control, which allocates the signals input to the plurality of second input ports to the first input port of the switch portion, to the input side port mapping portion, carrying out a control, which allocates the signals output from the first output port of the switch portion to a plurality of second output ports, to the output side port mapping portion, and controlling the connections between the plurality of first input ports and the plurality of first output ports of the switch portion.

2. The switch device according to claim 1, wherein the switch portion comprises switches that can expand the number of the first input ports and the first output ports.

3. The switch device according to claim 2, wherein the switch portion comprises a plurality of switch stages.

4. The switch device according to claim 1, wherein the switch portion comprises a plurality of switch stages.

5. The switch device according to claim 4, wherein:
   the plurality of switch stages comprise an input switch stage, an output switch stage, and one or a plurality of switch stages interposed between the input switch stage and the output switch stage;
   each of the input switch stage, the output switch stage, and the one or the plurality of switch stages comprises one or a plurality of unit switches each including a plurality of input ports and a plurality of output ports;
   the switch portion comprises a plurality of controllers which control the connections between the plurality of input ports and the plurality of output ports of the one or the plurality of unit switches and at least one of the controllers is disposed to each of the input switch stage, the output switch stage, and the one or the plurality of switch stages; and
   the central controller controls the plurality of controllers.

6. The switch device according to claim 5, wherein:
   the one or the plurality of unit switches and at least one controller of the input switch stage are disposed on one or a plurality of input line cards, the one or the plurality of unit switches and at least one controller of the output switch stage are disposed on one or a plurality of output line cards, and the one or the plurality of unit switches and at least one controller of the one or the plurality of switch stages are disposed on one or a plurality of switch cards;
   the switch card has a plurality of sub-switch cards, and the unit switches of one or the plurality of switch cards are disposed to each of the plurality of sub-switch cards.

7. The switch device according to claim 6, wherein the switch card is optically connected to the input stage line card, the switch card is optically connected to the output stage line card, and optical connection is carried out among the controller on the input stage line card, the controller on the output stage line card, and the controller on the switch card, and between the controller on the switch card and the central controller.

8. The switch device according to claim 7, wherein the unit switch on the input stage line card is an input buffer type switch, the unit switch on intermediate stage switch card is a bufferless switch, and the unit switch on the output stage line card is an output buffer type switch.

9. The switch device according to claim 7, wherein a card on which the input side port mapping block is mounted, a card on which the output side port mapping block is mounted, the input stage line card, the switch card, and the output stage line card are accommodated in one or a plurality of chassis.

10. The switch device according to claim 7, wherein the output line of the input stage line card connected to the switch card and the input line of the output stage line card connected to the switch card are disposed redundantly, and the signals from the input stage line card and the signals from the switch card are allocated to the redundant lines redundantly disposed as the output line of the input stage line card and the input line of the output stage line card according to the allocation control of the input side port mapping portion and the output side port mapping portion.

11. The switch device according to claim 6, wherein the switch card is optically connected to the input stage line card, the switch card is optically connected to the output stage line card, and optical connection is carried out between the central controller and the respective controllers on the input stage line card, output stage line card and switch card.

12. The switch device according to claim 11, wherein the unit switch on the input stage line card is an input buffer type switch, the unit switch on intermediate stage switch card is a bufferless switch, and the unit switch on the output stage line card is an output buffer type switch.

13. The switch device according to claim 11, wherein a card on which the input side port mapping block is mounted, a card on which the output side port mapping block is mounted, the input stage line card, the switch card, and the output stage line card are accommodated in one or a plurality of chassis.

14. The switch device according to claim 11, wherein the output line of the input stage line card connected to the switch card and the input line of the output stage line card connected to the switch card are disposed redundantly, and the signals from the input stage line card and the signals from the switch card are allocated to the redundant lines redundantly disposed as the output line of the input stage line card and the input line of the output stage line card according to the allocation control of the input side port mapping portion and the output side port mapping portion.

15. The switch device according to claim 6, wherein the unit switch on the input stage line card is an input buffer type switch, the unit switch on intermediate stage switch card is a bufferless switch, and the unit switch on the output stage line card is an output buffer type switch.

16. The switch device according to claim 15, wherein a card on which the input side port mapping block is mounted, a card on which the output side port mapping block is mounted, the input stage line card, the switch card, and the output stage line card are accommodated in one or a plurality of chassis.

17. The switch device according to claim 15, wherein the output line of the input stage line card connected to the switch card and the input line of the output stage line card connected to the switch card are disposed redundantly, and the signals from the input stage line card and the signals from the switch card are allocated to the redundant lines redundantly disposed as the output line of the input stage line card and the input line of the output stage line card according to the allocation control of the input side port mapping portion and the output side port mapping portion.

18. The switch device according to claim 6, wherein a card on which the input side port mapping block is mounted, a card on which the output side port mapping block is mounted, the input stage line card, the switch card, and the output stage line card are accommodated in one or a plurality of chassis.

19. The switch device according to claim 18, wherein a plurality of the chassis are provided, and optical connection is carried out between the chassis.

20. The switch device according to claim 19, wherein the output line of the input stage line card connected to the switch card and the input line of the output stage line card connected to the switch card are disposed redundantly, and the signals from the input stage line card and the signals from the switch card are allocated to the redundant lines redundantly disposed as the output line of the input stage line card and the input line of the output stage line card according to the allocation control of the input side port mapping portion and the output side port mapping portion.

21. The switch device according to claim 18, wherein the output line of the input stage line card connected to the switch card and the input line of the output stage line card connected to the switch card are disposed redundantly, and the signals from the input stage line card and the signals from the switch card are allocated to the redundant lines redundantly disposed as the output line of the input stage line card and the input line of the output stage line card according to the allocation control of the input side port mapping portion and the output side port mapping portion.

22. The switch device according to claim 6, wherein the output line of the input stage line card connected to the switch card and the input line of the output stage line card connected to the switch card are disposed redundantly, and the signals from the input stage line card and the signals from the switch card are allocated to the redundant lines redundantly disposed as the output line of the input stage line card and the input line of the output stage line card according to the allocation control of the input side port mapping portion and the output side port mapping portion.

23. A switching method of a switch device comprising a switch portion including a plurality of first input ports and a plurality of first output ports, an input side port mapping portion for inputting the signals input to a plurality of second input ports to the first input port of the switch portion through one third output port, and an output side port mapping portion for outputting the signals output from the first output port of the switch portion from a plurality of second output ports through one third input port, the input side port mapping portion including the plurality of second input ports and the one third output port, and the output side port mapping portion including the plurality of second output ports and the one third input port, wherein the switch portion is logically divided or integrated virtually by:

carrying out a control, which allocates the signals input to the plurality of second input ports to the first input port of the switch portion, to the input side port mapping portion;

carrying out a control, which allocates the signals output from the first output port of the switch portion to the plurality of second output ports, to the output side port mapping portion; and controlling the connections between the plurality of first input ports and the plurality of first output ports of the switch portion.

24. A non-transitory computer-readable recording medium with a switch control program of a switch device comprising a switch portion including a plurality of first input ports and a plurality of first output ports, an input side port mapping portion for inputting the signals input to a plurality of second input ports to the first input port of the switch portion through one third output port, an output side port mapping portion for outputting the signals output from the first output port of the switch portion from a plurality of second output ports through one third input port, and a central controller including at least an arithmetic processing unit and storage unit for controlling the switch portion, the input side port mapping portion, and the output side port mapping portion, the input side port mapping portion including the plurality of second input ports and the one third output port, and the output side port mapping portion including the plurality of second output ports and the one third input port, wherein:

the arithmetic processing unit carries out a control, which allocates the signals input to the plurality of second input ports to the first input port of the switch portion, to the input side port mapping portion based on control information stored to the storage unit;

the arithmetic processing unit carries out a control, which allocates the signals output from the first output port of the switch portion to a plurality of second output ports, to the output side port mapping portion based on control information stored to the storage unit; and the arithmetic processing unit controls the connections between the plurality of first input ports and the plurality of first output ports of the switch portion based on control information stored to the storage unit.

* * * * *